United States Patent [19]
Renwick

[11] Patent Number: 5,496,168
[45] Date of Patent: Mar. 5, 1996

[54] INJECTION MOLDING MANIFOLD HAVING A HEATING ELEMENT EXTENDING BETWEEN THE PLATES

[75] Inventor: Craig W. Renwick, 224 Barber Drive, Georgetown, Ontario, Canada, L7C 5K5

[73] Assignee: Craig W. Renwick, Georgetown, Canada

[21] Appl. No.: 254,558

[22] Filed: Jun. 6, 1994

[51] Int. Cl.⁶ ................................................. B29C 45/22
[52] U.S. Cl. .................. 425/547; 264/328.14; 425/549; 425/572
[58] Field of Search ................................ 425/549, 572, 425/547; 264/328.14

[56] References Cited

U.S. PATENT DOCUMENTS 4,648,546  3/1987  Gellert .
4,761,343  8/1988  Gellert ................................. 425/549
5,227,179  7/1993  Benenati ............................. 425/572

Primary Examiner—Tim Heitbrink
Attorney, Agent, or Firm—Dalesman & Company

[57] ABSTRACT

An injection molding melt distribution manifold and method of making it with a melt passage extending from a single inlet to a plurality of outlets. The melt passage has a branching portion formed by machining matching grooves in opposing surfaces of two steel plates and then integrally brazing them together. The manifold has an embedded electrical heating element received in a channel formed by two other matching grooves in the opposing surfaces of the two plates. The channel is then integrally filled with nickel by heating under a partial vacuum. The electrical heating element which extends around and is in or near the same plane as the branching portion of the melt passage to ensure rheological and thermal balance of the melt flowing therethrough.

2 Claims, 4 Drawing Sheets

5,496,168

INJECTION MOLDING MANIFOLD HAVING A HEATING ELEMENT EXTENDING BETWEEN THE PLATES

BACKGROUND OF THE INVENTION

This invention relates generally to injection molding and more particularly to a manifold having a heating element and a branching portion of a melt passage which extend in transverse planes not spaced far apart and a method of making it.

It is well known to have an injection molding manifold for a multi-cavity molding system in which the melt passage branches from a single inlet to a plurality of outlets. As seen in U.S. Pat. No. 4,648,546 to Gellert which issued Mar. 10, 1987, this is made by machining two matching grooves in the abutting surfaces of two steel plates and then brazing the plates together so the matching grooves form the branching portion of the melt passage. U.S. Pat. No. 4,648,546 also shows the manifold having an integral electrically insulated electrical heating element. However, the heating element is embedded in a channel in the front face of the manifold and thus is spaced a considerable distance from the branching portion of the melt passage. This has the disadvantage that the temperature gradient in different parts of the manifold due to heat loss to the nozzles and the surrounding mold results in the temperature of the branching portion of the melt passage not being sufficiently uniform and constant. This is particularly a problem for molding materials having a narrow temperature window. Furthermore, a very rapid heat up can result in slight bowing of the manifold.

SUMMARY OF THE INVENTION

Accordingly, it is an object of the present invention to at least partially overcome the disadvantages of the prior art by providing a manifold and a method of making it in which the heating element is in or close to the same plane as the branching portion of the melt passage. To this end, in one of its aspects, the invention provides an injection molding manifold having a rear face, a front face, an electrical heating element having a predetermined diameter embedded therein, and a melt passage extending therethrough from a common inlet on the rear face to a plurality of outlets spaced on the front face, the melt passage having an inlet bore, a plurality of outlet bores, and a branching portion connecting each of the outlet bores to the inlet bore, the inlet bore extending forwardly from the common inlet on the rear face, the outlet bores each extending rearwardly from a respective one of the outlets spaced on the front face, the branching portion extending in a first plane extending transversely to the inlet bore and the outlet bores of the melt passage, the improvement wherein the electrical heating element extends in a second plane extending transversely to the inlet bore and the outlet bores of the melt passage, the second transverse plane not being spaced apart from the first transverse plane further than the predetermined diameter of the heating element.

In another of its aspects, the invention provides a method of making an injection molding manifold having a rear face, a front face, and a melt passage extending therethrough from a common inlet on the rear face to a plurality of outlets spaced on the front face, the melt passage having an inlet bore extending forwardly from the common inlet on the rear face and a plurality of outlet bores each extending rearwardly from a respective one of the outlets spaced on the front face, comprising the steps of forming an elongated steel rear plate having a rear surface, a front surface, and the inlet bore extending therebetween, forming an elongated steel front plate having a rear surface, a front surface, and the outlet bores extending therebetween, one of the rear plate and the front plate having at least one brazing duct extending therethrough, machining a first groove in the front surface of the rear plate extending from the inlet bore and a matching second groove in the rear surface of the front plate extending to all of the outlet bores, securing the plates together with the front surface of the rear plate abutting against the rear surface of the front plate at an interface extending along a first transverse plane in a position wherein the matching first and second grooves form a branching portion of the melt passage extending in said first transverse plane to connect each of the outlet bores to the inlet bore, orienting the plates with the at least one brazing duct extending downward to the interface, providing a first quantity of conductive material at each of the at least one brazing ducts, and heating the plates in a partial vacuum in a position and to a sufficient temperature whereby the first quantity of conductive material melts and flows downwardly from the at least one brazing duct to the interface between the abutting front surface of the rear plate and rear surface of the front plate to integrally join the plates together to form the manifold and seal the melt passage against leakage, the improvement comprising forming said one of the rear plate and the front plate with at least one filling duct extending therethrough, machining a third groove having a predetermined depth in one of the front surface of the rear plate and the rear surface of the front plate, positioning an electrically insulated electrical heating element having a terminal in the third groove whereby when the front and rear plates are secured together the third groove forms a channel to which the at least one filling duct connects and in which the heating element is received with the terminal projecting therefrom, providing a second quantity of conductive material at each of the at least one filling ducts, whereby when the plates are heated the second quantity of conductive material melts and flows from the at least one filling duct into the channel around the heating element, whereby the heating element is embedded in the manifold extending in a second transverse plane not spaced apart from the first transverse plane further than the depth of the third groove.

In a further aspect, the invention provides a method of making injection molding manifold having a rear face, a front face, and a melt passage extending therethrough from a common inlet on the rear face to a plurality of outlets spaced on the front face, the melt having an inlet bore extending forwardly from the common inlet on the rear face and a plurality of outlet bores each extending rearwardly from a respective one of the outlets spaced on the front face, comprising the steps of forming an elongated steel rear plate having a rear surface, a front surface, and the inlet bore extending therebetween, forming an elongated steel front plate having a front surface, rear surface and the outlet bores extending therebetween, one of the rear plate and the front plate having at least one first brazing duct extending therethrough, machining a first groove in the front surface of the rear plate extending from the inlet bore and a matching second groove in the rear surface of the front plate extending to all of the outlet bores, securing the plates together with the front surface of the rear plate abutting against the rear surface of the front plate at an interface extending along a transverse plane in a position wherein the matching first and second grooves form a branching portion of the melt passage extending in said transverse plane to connect each of the outlet bores to the inlet bore, orienting the plates with the at least one brazing duct extending downward to the interface, providing a first quantity of conductive material at each of the at least one brazing ducts, and heating the plates in a partial vacuum in a position and to a sufficient temperature whereby the first quantity of conductive material melts and flows downwardly from the at least one brazing duct to the interface between the abutting front surface of the rear plate and rear surface of the front plate to integrally join the plates together to form the manifold and seal the melt passage against leakage, the improvement comprising forming said one of the rear plate, and the front plate with at least one filling duct extending therethrough, machining a third groove in the front surface of the rear plate, machining a fourth groove in the rear surface of the front plate to match the third groove in the front surface of the rear plate, positioning an electrically insulated electrical heating element having a terminal in one of the third and fourth grooves, whereby when the front and rear plates are secured together the third and fourth grooves form a channel to which the at least one filling duct connects and in which the heating element is received with the terminal projecting therefrom, providing a second quantity of conductive material at each of the at least one filling ducts whereby when the plates are heated the second quantity of conductive material melts and flows from the at least one filling duct into the channel around the heating element, whereby the heating element is embedded in the manifold extending in the same transverse plane as the branching portion of the melt passage.

Further objects and advantages of the invention will appear from the following description taken together with the accompanying drawings.

DETAILED DESCRIPTIONS OF THE INVENTION

Figure 1:
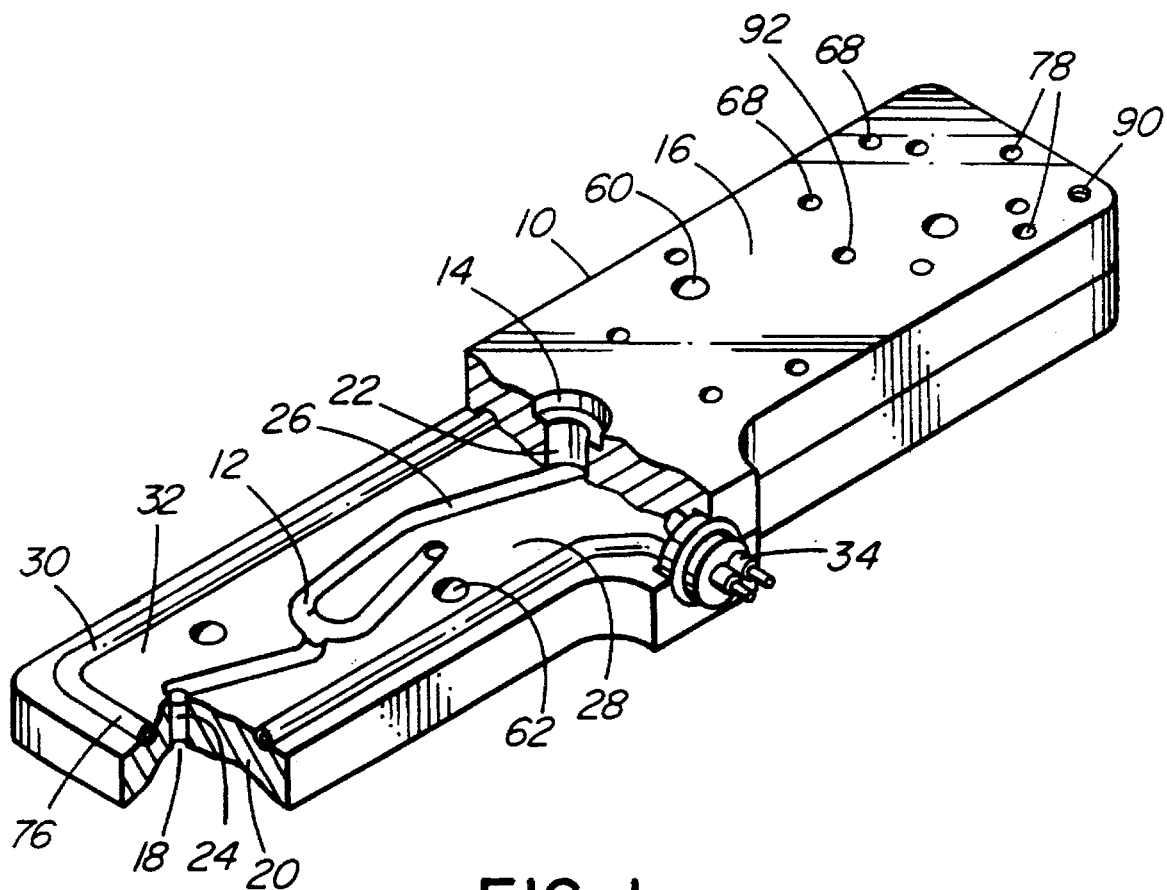
FIG. 1 is a partially cut-away isometric view of a manifold according to a preferred embodiment of the invention.

As best seen in FIG. 1, this invention relates to a heated melt distribution manifold 10 to be mounted in a multi-cavity injection molding system. A hot runner melt passage 12 extends through the manifold 10 to convey pressurized melt received from an injection molding machine at a common inlet 14 on the rear face 16 to a plurality of outlets 18 spaced on the front face 20 each aligned with a heated nozzle (not shown) extending to a gate to a cavity. The melt passage 12 has an inlet bore 22 extending forwardly from the inlet 14, a number of outlet bores 24 each extending rearwardly from one of the outlets 18, and a branching portion 26. The branching portion 26 connects each of the outlet bores 24 to the inlet bore 22 and extends in a first plane 28 extending transversely to the inlet and outlet bores 22, 24. The melt passage 12 is shaped to have a smooth finish with no sharp bends or dead spots to avoid deterioration of the pressurized melt which is injected through it. While the branching portion 26 of the melt passage 12 shown has a configuration for four outlets 18, it can have other configurations leading to other numbers of outlets 18. However, in all configurations, the distance between each of the outlets 18 and the common inlet 14 must be equal to ensure product uniformity.

The manifold 10 according to the invention also has an embedded electrical heating element 30 which extends in a second transverse plane 32 from a terminal 34 projecting from the manifold 10. As best seen in FIG. 4, the heating element 30 is electrically insulated with compacted magnesium oxide powder 36 extending around a central resistance wire 38 in an outer stainless steel casing 40. In the embodiment of the invention shown in FIGS. 1–4, the first plane 28 in which the branching portion 26 of the melt passage 12 extends is the same as the second plane 32 in which the heating element 30 extends. Furthermore, the heating element 30 encircles the branching portion 26 of the melt passage 12 which ensures that the melt in all of the branching portion 26 of the melt passage 12 is maintained at a uniform temperature.

In use, the manifold 10 as seen in FIG. 1 is mounted in a multi-cavity injection molding mold. Electrical power is applied to the terminal 34 to heat the melt distribution manifold 10 to a predetermined operating temperature. Pressurized melt is applied from a molding machine (not shown) to the central inlet 14 of the melt passage 12 according to a predetermined cycle. The melt flows through the melt passage 12 and branches out to the various cavities. After the cavities are filled and a suitable packing and cooling period has expired, the injection pressure is released. The mold is then opened to eject the molded products. After ejection, the mold is closed and the cycle is repeated continuously with a cycle time dependent upon the size of the cavities and the type of material being molded.

Reference is now made particularly to FIGS. 2, 3A, 3B and 4 to describe the method of making the manifold 10 according to the first embodiment. An elongated rear plate 42 and a matching elongated front plate 44 are made with a particular shape. In the preferred embodiment, these manifold plates 42, 44 are made of H13 tool steel, but can also be made of stainless steel. The rear plate 42 has a flat rear surface 46 and a flat front surface 48 with the inlet bore 22 of the melt passage 12 extending forwardly therethrough from the inlet 14. The front plate 44 has a flat rear surface 50 and a flat front surface 52 with the outlet bores 24 extending forwardly therethrough to the outlets 18. While the embodiment shown has only four outlets 18 extending in alignment, in other embodiments the front plate 44 can be made with eight, sixteen or more spaced outlets in different configurations depending upon the application.

Figure 3A:
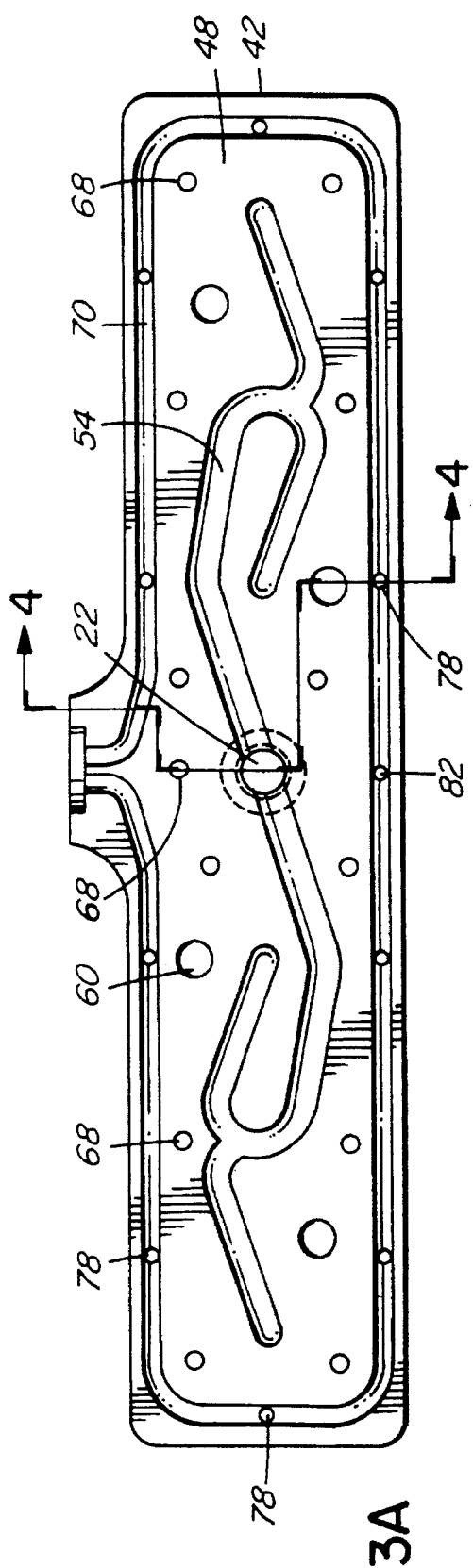
FIG. 3A is a view of the front surface of the rear plate.
Figure 3B:
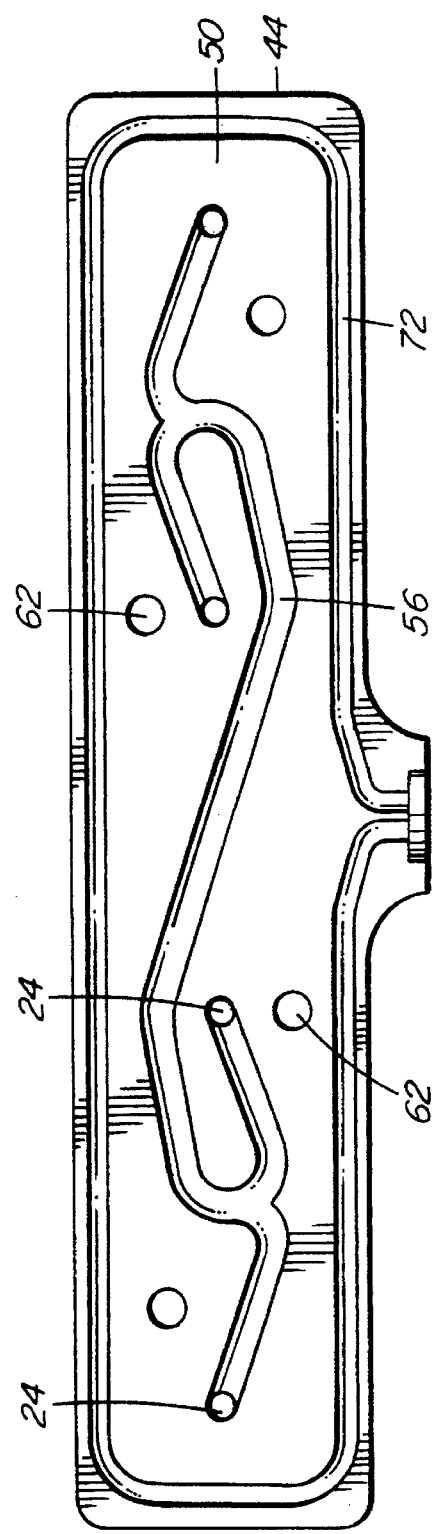
FIG. 3B is a view of the rear surface of the front plate.
Figure 4:
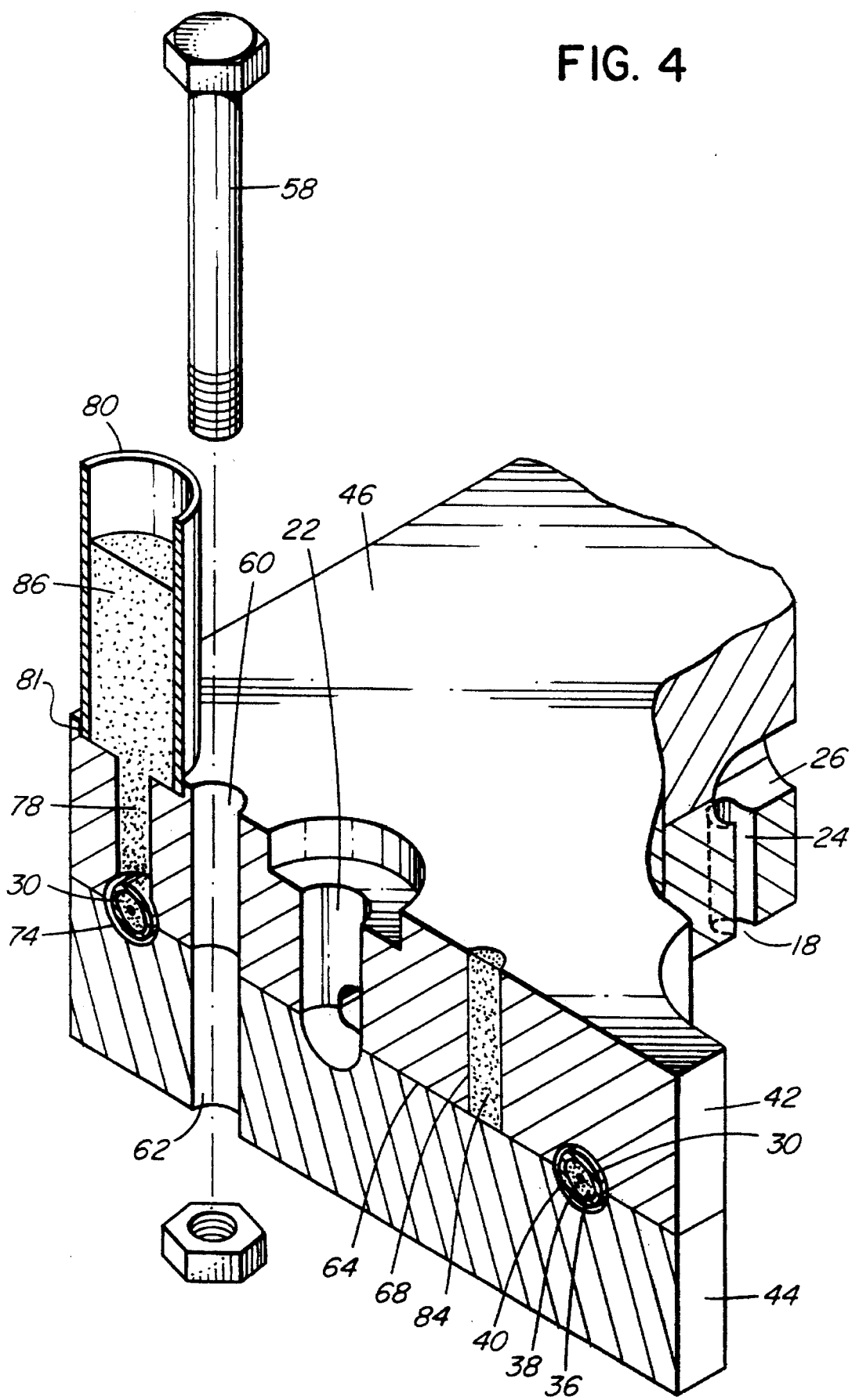
FIG. 4 is a view along lines 4—4 in FIG. 2 after the plates are bolted together.

As seen in FIGS. 3A and 3B, first a semicircular groove 54 is machined in the front surface 48 of the rear plate 42, and a matching second semicircular groove 56 is machined in the rear surface 50 of the front plate 44. As seen in FIG. 4, the rear and front plates 42, 44 are aligned and secured together by bolts 58 extending through holes 60, 62 in the plates 42, 44 with the front surface 48 of the rear plate 42 abutting with reasonable contact pressure against the rear surface 50 of the front plate 44 along an interface 64. The matching grooves 54, 56 are made with a configuration to form the branching portion 26 of the melt passage 12 when the plates 42, 44 are secured together. The branching portion 26 of the melt passage 12 splits several times in connecting the inlet bore 22 to each of the outlet bores 24. Thus, the entire branching portion 26 is in the common first plane 28 which extends along the interface 64 transversely to the inlet and outlet bores 22, 24. The rear plate 42 is also made with a number of spaced brazing ducts 68 which extend from the rear surface 46 to the interface 64.

In this embodiment, the plates 42, 44 are also machined to form a third semicircular groove 70 in the front surface 48 of the rear plate 42 and a matching fourth semicircular groove 72 in the rear surface 50 of the front plate 44. These matching grooves 70, 72 are made with a configuration to form a channel 74 in which the electrical heating element 30 is received when the plates 42, 44 are secured together. In this embodiment, the heating element 30 is in the same plane 28 as the branching portion 26 of the melt passage 12 and extends from the terminal 34 in a loop 76 near the outside of the manifold 10 which encircles the branching portion 26 of the melt passage 12. The rear plate 42 is made with a number of filling ducts 78 which extend from the rear surface 46 to the channel 74 and are spaced along the channel 74. While the rear plate 42 is shown having several brazing ducts 68 and filling ducts 78, the number of them can vary from one to quite a large number depending upon the size of the manifold being made. Also, while the brazing ducts 68 and filling ducts 78 are shown extending through the rear plate 42, in other embodiments of the invention they can be made to extend through the front plate 44. This depends upon which way up the assembled plates 42, 44 are positioned for filling, and the only requirement is that the brazing ducts 68 and filling ducts 78 must all extend through the same plate.

The heating element 30 is positioned in one of the third or fourth grooves 70, 72, and the two plates 42, 44 are secured together by the bolts 58 with the heating element 30 extending in the channel 74. Of course, the number and position of the bolts 58 required also depend on the size and shape of the manifold 10. In this embodiment, as seen in FIG. 4, a hollow filling tube 80 is seated in a recess 81 in the rear surface 46 of the rear plate 42 and tack welded in place over each of the filling ducts 78 leading to the heating element channel 74 except for one. One of ducts 78 is left as an air duct 82 to allow air to escape from the channel 74 as the plates 42, 44 are heated. With the plates 42, 44 positioned with the brazing ducts 68 and filling ducts 78 extending downwardly, a first quantity 84 of a conductive material such as nickel alloy in a powder form is inserted into each brazing duct 68. A larger second quantity 86 of nickel alloy in a powder form is inserted into each filling duct 78 and the filling tube 80 above it. The assembled plates are then loaded in batches into a vacuum furnace and gradually heated to a temperature of approximately 1925° F. which is above the melting temperature of the nickel alloy. As the furnace is heated, it is evacuated to a relatively high vacuum to remove substantially all of the oxygen and then partially backfilled with an inert gas such as argon or nitrogen. When the melting point of the nickel alloy is reached, the nickel alloy 84 in the brazing ducts 68 melts and flows downwardly to the interface 64 between the front surface 48 of the rear plate 42 and the rear surface 50 of the front plate 44. These surfaces 48, 50 are roughened and the nickel alloy spreads between them by capillary action to integrally braze the two plates 42, 44 together to form an integral manifold 10. Similarly, the nickel alloy 84 in the filling ducts 78 and filling tubes 80 melts and flows downwardly into the channel 74 where it flows around the heating element 30 to integrally embed the heating element 30 in the manifold 10. Brazing in a vacuum provides a metallurgical bonding of the nickel alloy to the steel for very efficient heat transfer from the heating element 10 to the manifold around the melt passage 12. The position of the heating element 30 in the same plane 28 as the branching portion 26 of the melt passage 12 ensures the melt is maintained at a more uniform temperature as it flows through the melt passage 12 during the injection cycle. After the nozzles 10 are removed from the vacuum furnace and cooled, they are machined to remove the filling tubes 80 and to provide the manifold 10 with smooth rear and front faces 16, 18. Pressure disc location holes 88 and manifold lift holes 90 are then drilled in the rear face 16 of the manifold 10 as required.

Figure 5:
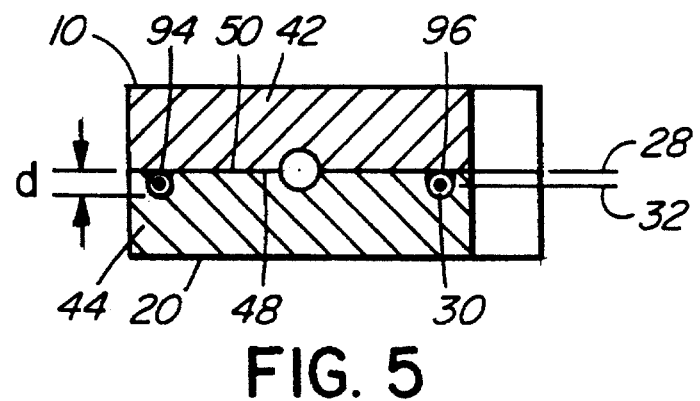
FIG. 5 is a cross-sectional view of a manifold according to another embodiment of the invention.
Figure 2:
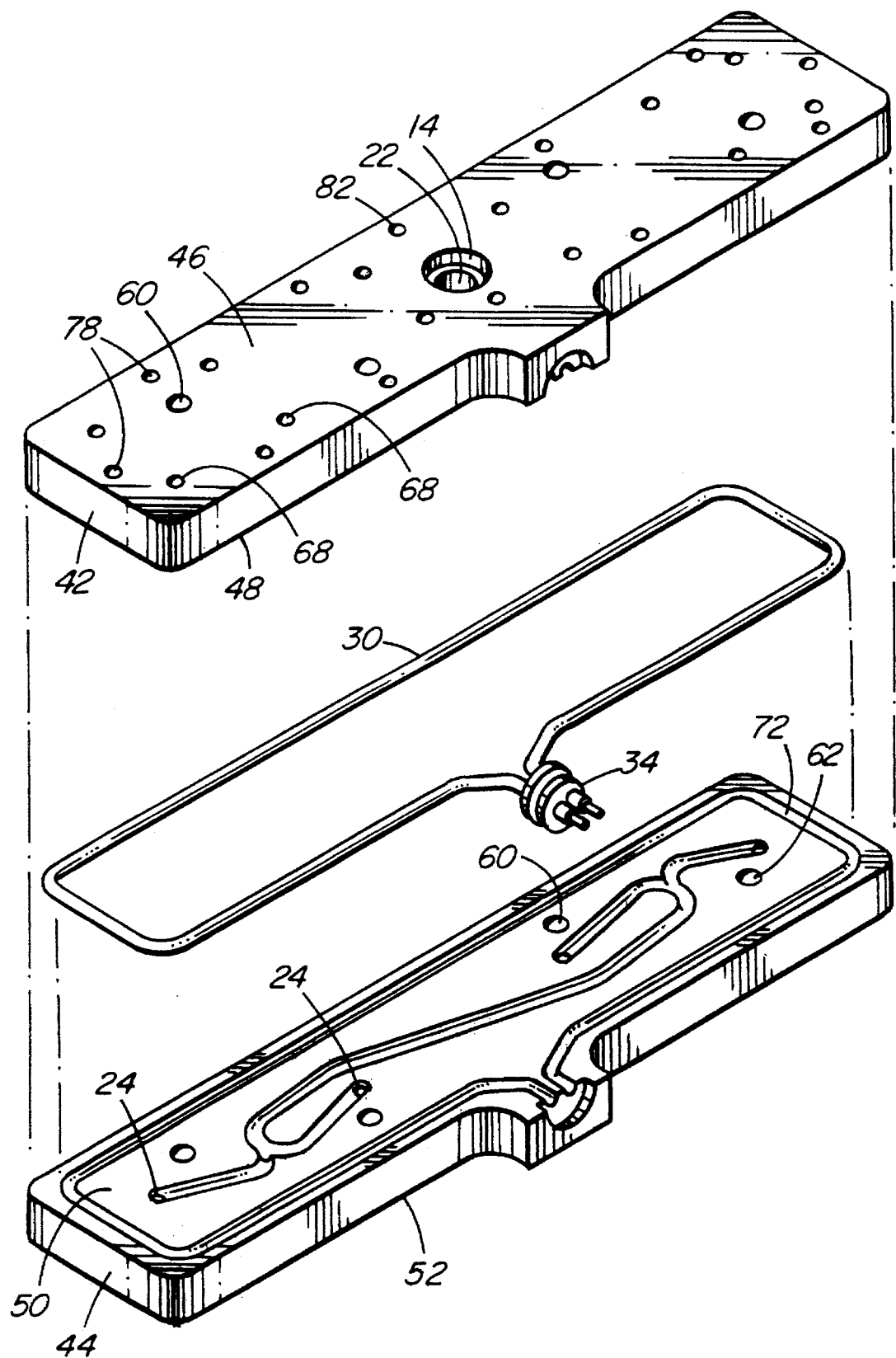
FIG. 2 is an isometric view of the electrical heating element between the rear and front plates.

Reference is now made to FIG. 5 to briefly describe a method of making the manifold 10 according to another embodiment of the invention. As most of the elements and steps are the same as described above, their description will not be repeated and elements common to this embodiment will be described and illustrated using the same reference numerals. As can be seen, in this case, a third groove 92 having a predetermined depth d is machined in the rear surface 50 of the front plate 44 and no matching groove is machined in the front surface 48 of the rear plate 42. The heating element 30 is positioned in the third groove 94 and the two plates 42, 44 are secured together as described above. Thus, the third groove 94 forms a channel 96 in which the heating element 30 extends and to which the filling ducts 78 connect. Then the assembled plates 42, 44 are heated as described above to melt the nickel alloy powder to integrally braze the plates 42, 44 together and embed the heating element 30 in the manifold 10. The difference from the embodiment described above is that the heating element 30 extends in a second plane 32 which extends transversely and is spaced apart from the first plane 28 in which the branching portion 26 of the melt passage 12 extends not further than the depth d and of the third groove 94. While the third groove 94 is shown in the rear surface 50 of the front plate 44, in another embodiment it can be in the front surface 48 of the rear plate 42 with the manifold 10 inverted in the filling and heating positions. A manifold 10 having the two planes 28, 32 offset from each other like this does not have quite as good thermal characteristics as the one described above where they are in the same plane, but it is slightly easier to make because machining one less groove is required.

While the description of the injection molding manifold and method of making it according to the invention has been given with respect to preferred embodiments, it will be evident that various other modifications are possible without departing from the scope of the invention as understood by those skilled in the art and as defined in the following claims.

The embodiments of the invention in which an exclusive property or privilege is claimed are defined as follows:

1. An injection molding manifold having a rear face, a front face, an electrical heating element having a predetermined diameter embedded therein, and a melt passage extending therethrough from a common inlet on the rear face to a plurality of outlets spaced on the front face, the melt passage having an inlet bore, a plurality of outlet bores, and a branching portion connecting each of the outlet bores to the inlet bore, the inlet bore extending forwardly from the common inlet on the rear face, the outlet bores each extending rearwardly from a respective one of the outlets spaced on the front face, the branching portion extending in a first plane extending transversely to the inlet bore and the outlet bores of the melt passage, the improvement wherein;

the electrical heating element extends in a second plane extending transversely to the inlet bore and the outlet bores of the melt passage, the second transverse plane being substantially the same as the first transverse plane in which the branching portion of the melt passage extends.

2. An injection molding manifold as claimed in claim 1 wherein the electrical heating element is electrically insulated, has a terminal projecting from the manifold, and extends from the terminal in a loop encircling the branching portion of the melt passage.

* * * * *

UNITED STATES PATENT AND TRADEMARK OFFICE
CERTIFICATE OF CORRECTION

PATENT NO. : 5,496,168

DATED : March 5, 1996

INVENTOR(S) : C.W. Renwick

It is certified that error appears in the above-indentified patent and that said Letters Patent is hereby corrected as shown below:

On the title, item [73], change it to read -- MOLD-MASTERS LIMITED --.

Signed and Sealed this

Twenty-ninth Day of October 1996

*Attest:*

BRUCE LEHMAN

*Attesting Officer*　　　*Commissioner of Patents and Trademarks*